Nov. 14, 1961  A. S. JANKOWSKI  3,009,109
ELECTRICAL TESTING APPARATUS
Filed June 10, 1959  2 Sheets-Sheet 1

INVENTOR.
ALFRED S. JANKOWSKI
BY
Elmer J. Nealon
ATTORNEY.

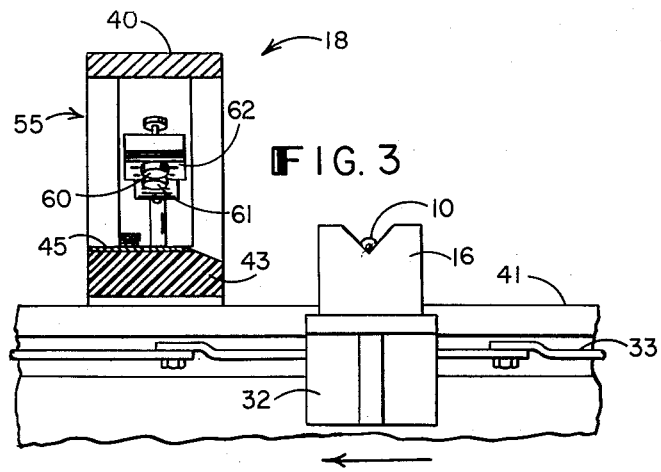
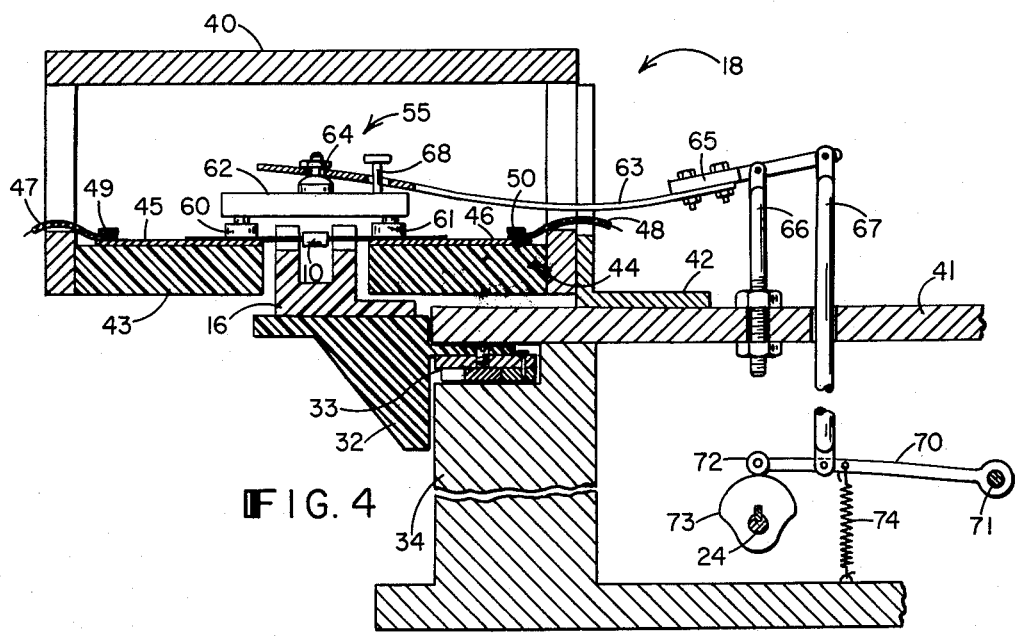

United States Patent Office 3,009,109
Patented Nov. 14, 1961

3,009,109
ELECTRICAL TESTING APPARATUS
Alfred S. Jankowski, Stoneham, Mass., assignor to Sylvania Electric Products Inc., a corporation of Delaware
Filed June 10, 1959, Ser. No. 819,334
6 Claims. (Cl. 324—158)

The present invention relates to apparatus for testing electrical elements. More particularly it is concerned with apparatus for automatically making and breaking electrical contact to axial lead electrical components undergoing automatic testing.

During automatic testing of electrical elements wherein each element is moved in sequence through a series of test stations it is necessary that electrical contact be made between each element and the test terminals at each test station. Contact to the leads of each device must be made automatically, and then released automatically upon completion of the test in order to permit the element to be moved to the next test station. The manner of making and breaking electrical contact should not subject elements to forces which could cause damage thereto or would deform the leads. Each contact must be such as to avoid detrimental effects caused by excessive contact resistance between element leads and test terminals. Simplicity in the apparatus as well as high reliability in its operation are also particularly desirable in automatic testing equipment.

It is an object of the invention, therefore, to provide an improved apparatus for making electrical contact to electrical elements.

It is also an object of the invention to provide an improved apparatus for automatically connecting the leads of an axial lead component to test terminals.

It is another object of the invention to provide an improved apparatus for automatically connecting axial lead components to each set of a series of sets of test terminals in sequence.

Briefly, in accordance with the objects of the invention an electrical element is supported in a carrier which is moved along a path into a test position. As the carrier moves laterally toward the position, approach surfaces arranged at an angle to the direction of movement of the carrier intercept the element. Adjacent the approach surfaces are contact surfaces. The element is diverted from the path being followed by the carrier onto the contact surfaces by the interposed approach surfaces. The carrier stops in the position with the element in contact with the contact surfaces. A hold-down member then engages and forces the element against the contact surfaces. The contact surfaces serve as the test terminals for connecting the element to the desired test circuitry while an electrical test is conducted. Upon completion of the test, the hold-down member is disengaged from the element and the element is removed from the contact surfaces by resumed motion of the carrier.

Apparatus of the above type for making contact to an element is shown and described in patent application SN 807,550, entitled "Testing and Sorting Apparatus," filed on April 20, 1959, by Rodney W. Clukey, and assigned to the assignee of the present invention, The apparatus as shown therein includes the subject matter of the invention described and claimed in the present application. Additional objects, features and advantages of apparatus according to the invention will become apparent from the following detailed description and the accompanying drawings wherein:

FIG. 3 is an elevational side view in cross section along line 3—3 of FIG. 2 showing an element and carrier approaching the test station; and FIG. 4 is an elevational view partially in cross section of the apparatus of FIG. 2 looking in the direction of movement of the carrier and showing the carrier in position with electrical contact made to the element.

Figure 1:
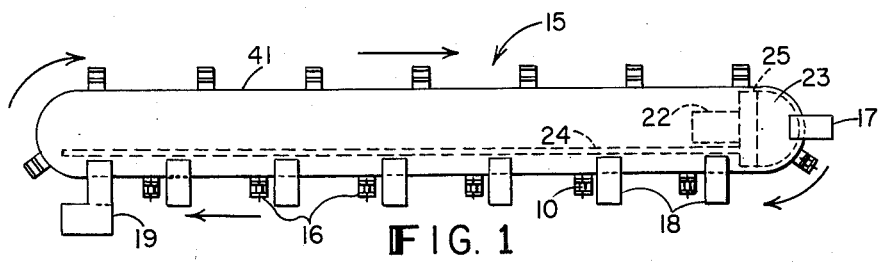
FIG. 1 is a schematic representation of a conveyor apparatus for subjecting electrical elements to a plurality of tests at a plurality of test stations.

The conveyor mechanism 15 as shown schematically in FIG. 1 has a plurality of equally spaced carriers 16 adapted for holding a semiconductor diode 10 having axially extending leads. The operating cycle for the conveyor includes a dwell period and a transfer period. During a dwell period each carrier of the conveyor remains fixed at a position. During a transfer period the conveyor indexes and each carrier is moved from one position to the next position in sequence. A loading mechanism 17 for placing a diode in each carrier is located at one position, and a test station 18 according to the invention is located at each of the six succeeding positions. An unloading mechanism 19 is located adjacent the last test station of the series. In FIG. 1 the carriers are shown during a transfer period as they are leaving one position and approaching the next position in series. The conveyor is operated by a motor 22 connected through suitable coupling means to appropriate gears 23 for driving the carrier in accordance with the desired operating cycle of dwell and transfer periods. A continuously rotating cam shaft 24 connected to the motor through a gear mechanism 25 rotates at a constant speed through one complete revolution during each operating cycle of the conveyor. One type of conveyor which has been employed according to the invention has a dwell time of 1.6 seconds and a transfer time of 0.8 second. The total operating cycle is thus 2.4 seconds permitting 1,500 items to be subjected to each of the series of tests in one hour.

Figure 2:
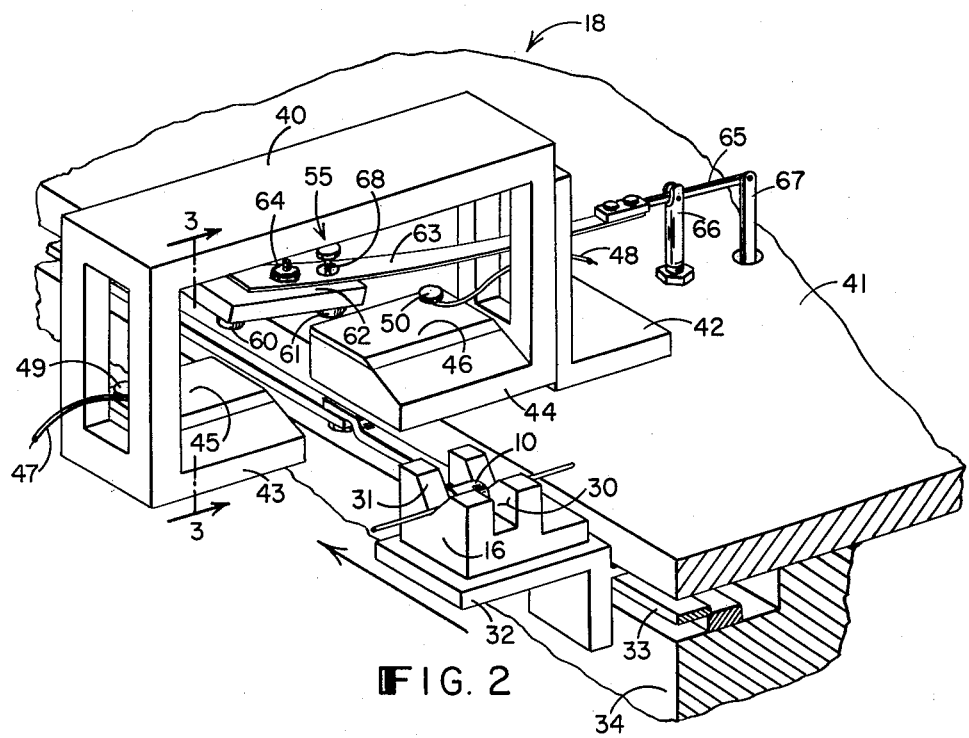
FIG. 2 is a perspective view of a test station of the apparatus of FIG. 1 showing an element supported in a carrier as it approaches the test station.

Semiconductor diodes 10 of well-known configuration having a lead extending axially therefrom in each direction are loaded individually into carriers 16 at the loading station 17 which may, for example, be of the type shown in the aforementioned Clukey application. Each carrier, which may best be seen in FIG. 2, is of a suitable electrically insulating material such as, for example, a plastic of the polymerized fluorinated ethylene type sold under the trade name of Teflon. The carrier has a groove 30 extending therethrough along the direction of movement which is wide enough to receive the body of a diode. A diode is supported in the carrier on its axial leads which rest in the bottom of V-slots or grooves 31 placed in the carrier such that the axis of the diode is transverse to the direction of movement of the carrier. The groove 30 is sufficiently deep so that the body of the diode is suspended only by its leads. The carrier is mounted on a support 32 attached to a link in the conveyor chain 33 which is movably suported in the frame 34 of the conveyor apparatus.

The various parts of the test station 18 as well as their manner of cooperation with the carrier and diode to be tested may best be understood from a discussion of the perspective view of FIG. 2 together with the elevational views of FIGS. 3 and 4. A supporting frame or housing 40 for the test station is mounted to a surface plate 41 by means of a bracket 42. The surface plate is fastened to the frame 34 of the conveyor. Two blocks 43 and 44 each with a sloping face are attached to the supporting frame in position for the sloping faces to incept the leads of an oncoming diode while providing space between them for the carrier 16 to pass unobstructed. These faces serve as approach surfaces to two hardened steel contact plates or anvils 45 and 46 mounted on top of the blocks and electrically insulated from each other and from other parts of the apparatus. The top or contact surfaces of the contact plates are horizontal and lie below the level of the topmost portion of the carrier and above the level of the bottom of the V-slots. Lead wires 47 and 48 are connected by means of binding posts 49 and 50 to the contact plates 45 and 46, respectively, for making connections to the test circuit (not shown) to which it is desired to connect the diode while it is in position at the test station. Each test station also includes a hold-down mechanism 55 for assuring that good electrical contact is made between each lead of the diode and a respective contact plate. The various parts and the operation of the hold-down mechanism may best be understood in conjunction with the manner of operation of the other portions of the apparatus described hereinabove.

During each transfer period a carrier 16 and diode 10 approach a test station as shown in FIGS. 2 and 3. The conveyor chain 33 moves the carrier along a horizontal path toward the dwell position it occupies at the station. As the carrier approaches the end of the transfer movement, the leads of the diode are intercepted by the inclined ramps provided by sloping faces of the blocks 43 and 44 which constitute the approach to the contact plates 45 and 46. The diode is diverted from its horizontal path and forced to rise slightly in the carrier by the combination of the horizontal forward movement of the carrier along its path and the oblique angle of the ramps interposed across the horizontal paths being followed by the diode leads. As the diode moves up the incline, its leads are supported by the sloping faces of the blocks and by the trailing sides of the slots against which they bear. When the diode reaches the top horizontal surfaces of the contact plates, it is pushed horizontally by the carrier, a portion of which is above the level of the contact plates, and at this point the leads are supported by the contact plates. The carrier comes to rest at the end of the transfer period with the carrier located between the blocks 43 and 44 and with the diode resting by its leads on the contact plates 45 and 46 as may be seen in FIG. 4.

When the carrier is in position with the diode leads resting on the contact surfaces, the hold-down mechanism 55 is actuated in order to force the leads into good electrical contact with the contact surfaces of the anvils 45 and 46. The hold-down mechanism includes two hardened metal contact buttons 60 and 61 for making contact with the leads. The buttons are mounted in a block 62 of a suitable electrically insulating material such as, for example, Teflon. The block is fastened to one end of a leaf spring 63 by means of a connector 64 which permits flexing of the spring independently of the block. A pin 68 mounted in the block protrudes loosely through an aperture in the leaf spring in order to prevent the block from pivoting about the connector. The opposite end of the leaf spring is attached to a rigid extension arm 65 which in turn is pivotally mounted at one point to an adjustable fixed support 66 and at its end to a linkage rod 67. The linkage rod is pivotally connected to a rocker arm 70 located beneath the surface plate 41 of the conveyor. One end of the rocker arm is pivotally connected to a pivot or bearing member 71 which is fixedly mounted with respect to the frame 34 of the conveyor. A freely rotating cam follower 72 mounted at the other end of the rocker arm 70 rides on the surface of a cam 73 mounted on and keyed to the continuously rotating cam shaft 24. The cam-follower 72 is biased against the cam surface by means of a tension spring 74 fastened to a portion of the conveyor frame 34.

At some particular instant after the start of the dwell period the continuously rotating cam shaft 24 rotates the cam into position so as to force the cam follower 72 upward thus moving the linkage rod 67 upward and pivoting the leaf spring 63 and hold-down mechanism 55 downward. This action moves the contact buttons downward into contact with the diode leads. Movement of the linkage arm continues after the contact is made thus bending the leaf spring as shown in FIG. 4. Not only does this action force the buttons downward into good contact, but as the leaf spring bends the buttons are pulled very slightly to the right as shown in FIG. 4, providing a slight sidewise component of motion or a scrubbing action between the buttons, leads, and contact plates. Thus, excellent electrical contacts are obtained without bending or deforming of the leads or subjecting of the body of the diode to any stresses.

With proper electrical contact made between the diode leads and the contact plates, the desired test conditions may be applied to the diode through the leads 47 and 48. Toward the end of the dwell period and after completion of the test, the orientation of the cam permits the cam-follower to move downward thus pivoting the leaf spring and raising the hold-down member clear of the diode and carrier as shown in FIGS. 2 and 3. Upon completion of the dwell period, the conveyor chain moves the carrier out of the test station. The diode is pushed along horizontally by the carrier while being vertically supported by the contact plates. As it is pushed beyond the test station, the diode falls back into its rest position in the carrier with the leads at the bottom of the V-slots.

The diode is moved during each subsequent transfer period to the next station in the series as can be seen from FIG. 1. Electrical contact to the diode is made at each test station during a dwell period in the manner described hereinabove. After the diode has been tested in the sixth test station, as shown in FIG. 1, it is unloaded from the carrier at an unloading station 19. The unloader may, for example, be of the type shown and described in the aforementioned Clukey application. This application also teaches a manner in which the data on tests conducted at each test station may be utilized to classify the diode and place it in a particular location as it is unloaded from the carrier.

Apparatus as shown and described herein provides for transporting a diode and bringing it into contact with a different set of test terminals during each dwell period of the operating cycle until it has passed through each of a series of test stations in sequence. Electrical contact is made automatically and in a manner to minimize contact resistance. The apparatus as shown and described provides a simple and highly reliable means for automatically making and breaking electrical contact to elements being subjected to a series of electrical tests.

What is claimed is:

1. Apparatus for temporarily making electrical contact to an electrical element for the purpose of conducting an electrical test thereon including a carrier for supporting an electrical element, conveying means for moving the carrier laterally into a position, bearing surface means having contact surfaces located at said position for contacting an element when a carrier is at said position and approach surfaces for intercepting an element as the carrier moves toward said position, said approach surfaces sloping upwardly to said contact surfaces whereby an element as it is moved with said carrier is moved upwardly by said approach surfaces and contacts said contact surfaces when said carrier is in said position, and hold-down means for forcing said element against said contact surfaces while said element is in contact with said contact surfaces.

2. Apparatus for temporarily making electrical contact to an electrical element for the purpose of conducting an electrical test thereon, said apparatus including contact members having contact surfaces, inclined ramps adjoining said contact surfaces and sloping downward therefrom, a carrier for supporting an element, conveyor means for moving said carrier along a horizontal path, said path and said contact surfaces and ramps being arranged for bringing an element positioned in said carrier into contact with said ramp, movement of the carrier farther along the path causing the element to move along the ramp and onto said contact surfaces, means for stopping said conveyor means with said element contacting said contact surfaces, and hold-down means for forcing said element against said contact surfaces while said element is in contact with said contact surfaces.

3. Apparatus for temporarily making electrical contact to an electrical element having leads extending axially therefrom for the purpose of conducting an electrical test thereon, said apparatus including a carrier having grooves arranged to receive an element therein with leads extending beyond said carrier on each side thereof, conveyor means for moving said carrier along a horizontal path normal to the axis of said element, a ramp arranged in the path of each lead whereby as said carrier is moved along said path the element is lifted vertically as it is moved with said carrier, a contact plate having an edge abutting the top of each ramp, means for stopping said conveyor means with the carrier located between the ramps so that the leads of an element rest on said contact plates, and a hold-down member for forcing said leads against said contact plates while said leads are in contact with the plates.

4. Apparatus for temporarily making electrical contact to an electrical element having leads extending axially therefrom for the purpose of conducting an electrical test thereon, said apparatus including a carrier having grooves arranged to receive an element therein with leads extending beyond said carrier on each side thereof, conveyor means for moving said carrier along a horizontal path normal to the axis of said element, an inclined ramp arranged on each side of the path for intercepting the leads of an element as said carrier is moved along the path, a horizontal contact plate arranged adjacent the top of each inclined ramp and lying below the uppermost portion of said carrier, whereby as said carrier is moved along the horizontal path the leads of an element in said carrier are intercepted by said ramps and are transferred onto said contact plates, means for stopping said conveyor means with the carrier in position between the contact plates and with the leads of an element resting on the contact plates, a hold-down mechanism having contact buttons adapted for contacting each lead of an element while the carrier is in said position, and actuating means for forcing said contact buttons against said leads while said leads are resting on the contact plates.

5. Apparatus for temporarily making electrical contact to an electrical element having leads extending axially therefrom for the purpose of conducting an electrical test thereon, said apparatus including a support, a carrier movable with respect to said support, said carrier having grooves for receiving and supporting an element therein with leads extending beyond said carrier on each side thereof, conveyor means for moving said carrier laterally along a path normal to the axis of said element, inclined ramps fixedly mounted with respect to said support and arranged on each side of the path for intercepting the leads of an element as said carrier is moved along the path, horizontal contact plates adjoining the top of each individual ramp and lying below the uppermost portion of said carrier, whereby as said carrier is moved along the path the leads of an element supported in said carrier are intercepted by said ramps and are raised onto said contact plates, means for stopping said conveyor means with the carrier in poistion between the contact plates and with the leads of an element resting on the contact plates, a hold-down mechanism having a pair of contact buttons mounted in an insulating support and positioned above said contact plates, and actuating means for lowering said hold-down mechanism and forcing said buttons into contact with said leads while said leads are on the contact plates, said actuating means including a flexible arm attached to the insulating support and pivoted at a point remote from said block whereby after initial contact of said buttons with the leads the arm bends to impart lateral motion to the contact buttons.

6. Apparatus for making a series of electrical contacts to electrical elements having leads extending axially therefrom for the purpose of conducting a series of electrical tests thereon; said apparatus including a loading station and a plurality of test stations; a conveyor mechanism having a plurality of carriers and an operating cycle including a dwell period during which a carrier is in position at each of said stations and a transfer period during which each carrier is moved along a horizontal path from one station to the next station in sequence; each of said carriers having grooves for receiving and supporting an element therein with leads extending beyond the carrier on each side thereof normal to said path; loading means for placing a single element in each carrier as it is presented at the loading station; each of said testing stations having an inclined ramp arranged on each side of the path for intercepting the leads of an element as a carrier is moved along said path, a horizontal contact plate adjoining the top of each inclined ramp and lying below the uppermost portion of said carriers, and electrical connections to each of said contact plates for applying test conditions thereto; whereby as said carriers are moved along the horizontal path the leads of each element supported in a carrier are intercepted by the ramps and are raised onto said contact plates; the dwell period of said operating cycle occuring while the carriers are in position between the inclined ramps and contact plates with the leads of elements setting on the contact plates; each of said testing stations also including a hold-down mechanism having a contact button positioned above each of said contact plates; actuating means associated with said conveyor mechanism for moving said hold-down mechanisms downward and forcing said contact buttons against said leads during the dwell period; said actuating means being adapted for imparting a horizontal movement to said hold-down mechanisms after said buttons have completed their downward movement; and unloading means for removing an element from its carrier subsequent to movement of the element from the final one of said plurality of test stations.

References Cited in the file of this patent

UNITED STATES PATENTS

| | | |
|---|---|---|
| 2,736,862 | Tooker | Feb. 28, 1956 |
| 2,867,771 | Denault et al. | Jan. 6, 1959 |